US006924341B2

(12) United States Patent
Mays et al.

(10) Patent No.: US 6,924,341 B2
(45) Date of Patent: Aug. 2, 2005

(54) POLYMER FORMATION IN ROOM TEMPERATURE IONIC LIQUIDS

(75) Inventors: Jimmy W. Mays, Knoxville, TN (US); Lujia Bu, Shrewsbury, MA (US); Robin D. Rogers, Tuscaloosa, AL (US); Kunlun Hong, Knoxville, TN (US); Hongwei Zhang, Knoxville, TN (US)

(73) Assignee: The UAB Research Foundation, Birmingham, AL (US)

( * ) Notice: Subject to any disclaimer, the term of this patent is extended or adjusted under 35 U.S.C. 154(b) by 62 days.

(21) Appl. No.: 10/473,455

(22) PCT Filed: Apr. 1, 2002

(86) PCT No.: PCT/US02/10091

§ 371 (c)(1),
(2), (4) Date: Apr. 7, 2004

(87) PCT Pub. No.: WO02/079269

PCT Pub. Date: Oct. 10, 2002

(65) Prior Publication Data

US 2004/0158009 A1 Aug. 12, 2004

Related U.S. Application Data

(60) Provisional application No. 60/280,201, filed on Mar. 30, 2001, and provisional application No. 60/279,993, filed on Mar. 30, 2001.

(51) Int. Cl.[7] .................................................. C08F 2/00
(52) U.S. Cl. .......................... 526/89; 529/193; 529/204; 529/217; 529/319; 529/329.2; 529/329.7; 529/346; 525/242; 525/299
(58) Field of Search .......................... 526/89, 193, 204, 526/217, 319, 329.2, 329.7, 346; 525/242, 299

(56) References Cited

U.S. PATENT DOCUMENTS

| 5,015,708 A |   | 5/1991 | Shih et al. ................... 526/264 |
|---|---|---|---|
| 5,191,043 A |   | 3/1993 | Shih ............................ 526/212 |
| 5,304,615 A | * | 4/1994 | Ambler et al. ............... 526/489 |
| 5,713,101 A |   | 2/1998 | Jackson ........................ 15/302 |
| 5,731,101 A | * | 3/1998 | Sherif et al. ................. 429/102 |
| 2002/0010291 A1 | * | 1/2002 | Murphy ....................... 526/133 |

OTHER PUBLICATIONS

Kendall, J.L. et al. (1999) "Polymerization in Supercritical Carbon Dioxide." Chem. Rev. 99:543.
Canelase, D.A. et al. (1997) "Polymerizations in Lipid and Supercritical Carbon Dioxide." Adv. Polym. Sci. 133:103.
Shaffer, K.A. et al. (1995) "Chain Polymerizations in Inert Near– and Supercritical Fluids." Trends in Polymer Science 3:146.
Shibo, H. et al. (1999) "Preparation of Micron–Size Polystyrene Particles in Supercritical Carbon Dioxide." Polymer Chemistry 37:2429.
Carlin, R.T. et al. (1990) "Complexation of Cp2MC12 in a chloroaluminate molten salt: relevance to homogenous Ziegler–Natta catalysis." Journal of Molecular Catalysis 63:125.

Chauvin. Y. et al. (1995) "A Novel of Versitile Solvents for Phase Catalysis–Hydrogenation, Isomerization and Hyroformylation of Alkenes Catalyzed by Rhodium Complexes in Liquid 1,3–Dialkylimidazolium Salts." Angew. Chem. Int. Ed. Engl. 34:2698.
McEwan, A.B. et al. (1999) "Elecrochemical Properties of Imidazolium Salt Electrolytes for Electrochemical Capacitor Applications." J. Electrochem. Soc. 146:1687.
Rogers, R.D. et al. (1999) "Room TemperaturIonic Liquids asREplacements for Volatile Organic Solvents in Liquid/ Liquid Separation" in *Metal Seperation Technologies Beyond 2000: Integrating Novel Chemistry with Processing*. The Minerals, Metals, and Materials Society, Warrendale, PA.
Visser, A.E. et al. (2000) "Traditional Extractants in Non-traditional Solvents: Group 1 and 2 Extraction by Crown Ethers in Room–Temperature Ionic Liquids." Ind. Eng. Chem. Res. 39:3596.
Visser, A.E. et al. (2001) "Liquid/Liquid Extractionof Metal Ions in Room Temperature Ionic Liquids." Seperation Science and Technology 36(5&6):785.
Odian, G. (1991) *Principles of Polymerization*, NewYork: John Wiley and Sons p. 241.
Kamachi, M. et al. (1989) "Propagation and Termination Constants in Free Radical Polymerization."
Freemantle, M. "Designer Solvents: Ionic Liquids may Boost Clean Technology Development,"Chem. Eng. News-(Mar. 30, 1998)32–37.
Sato, T. et al. (1984) "Long–Lived Polymer Radicals. VI. Polymerization ofN–Methylmethacrlamide with formation of Living Propogating Raicals,"J. Polym. Sci., Polym Chem. Ed., 22:3921.
Lewis, D.A. (1992) "Microwave Processing of Polymers–An Overview," Mat. Res. Soc. Symp. Proc. 269:21.
Brazel, C.S. (1999) "Suspension Polymerization of Acrylate Monomer Particulates Using Microwave Energy." AIChE 1999 Annual Meeting, AICh, New York, NY.
Zhang, Hongwei et al. (2002) "Homopolymerization and Block Copolymer Formation in Room–Temperature Ionic Liquids Using Conventional Free–Radical Initiators." ACS Symposium Series 818.
Sawamoto, M. et al. (1999) "Transition—metal—catalyzed living—radical polymerization" ChemTech, 30–38.

(Continued)

*Primary Examiner*—Fred Teskin
(74) *Attorney, Agent, or Firm*—Gifford, Krass, Groh, Sprinkle, Anderson & Citkowski, P.C.

(57) ABSTRACT

Methods and compositions for polymerization in ionic medium liquid at room temperature provide the benefit of allowing polymerization reactions to be carried out cheaply, and relatively quickly. The replacement of VOCs by these environmentally benign solvents has the further advantage of increased safety for chemical workers.

30 Claims, 5 Drawing Sheets

OTHER PUBLICATIONS

Welton, R. (1999) "Room–Temperature Ionic Liquids: Solvents for Synthesis an Catalysis,"Chemistry Review, 99:2071.

Hsaio, Y.–L. et al. (1995) "ispersion Polymerization of Methyl Methacrylate Stabilize with Poly(1,1–dihyroperfluoocytlacrylate) in Supercritical Carbon Dioxide," Macromolecules, 28:8159.

DeSimone, J.M. et al. "Dispersion Polymerization in Supercritical Carbon Dioxide," Science, 265, 356 (1994).

Hsiao, Y.–L. et al. Journal of Polymer Science, Part A: Polymer Chemistry, 35, 2009 (1997).

Shaffer, K.A. et al. "Dispersion Polymerizations in Carbon Diozide Using Siloxane–Based Stabilizers," Macromolecules, 29, 2704 (1996).

O'Neill, M.L. et al. "Dispersion Polymerization in Supercritical CO2 with Siloxane–Based Macromonomer: 2. The Partical Formation Regime," Macromolecules, 31, 2848 (1998).

O'Neill, M.L. et al. "Dispersion Polymerization in Supercritical Co2 with a Siloxane–Based Macromonomer: 1. The Partical Growth Regime," Macromolecules, 31, 2838.

Lepilleur, C. et al. "Dispersion Polymerization of MEthyl Methacrylate in Supercritical CO2," Macromolecules, 30, 745 (1997).

Yong, T.–M. et al. "Synthesis of Fluorinated Block Copolymers and their Applications as Novel Polymerization Surfactants in Supercritical Carbon Dioxide," Chem. Commun., 1811 (1997).

Canelas, D.A. et al. "Dispersion Polymerization of Styrene in Supercritical Carbon Dioxide: Importance of Effective Surfactants," Macromolecules, 29, 2818 (1996).

Canelas, D.A. et al. "Dispersion Polymerization of Styrene in Carbon Dioxide Stabilized with Poly(styrene–b–dimethylsiloxane)," Macromolecules, 30, 5673 (1997).

Cooper, A.I. et al. "Synthesis of Highly Cross–Linked Polymers in Supercritical Carbon Dioxide by Heterogeneous Polymerization," Macromolecules, 32, 2156 (1999).

Shiho, H. and DeSimone, J.H. "Dispersion Polymerization of Acrylonitrile in Super–Critical Carbon Dioxide," Macromolecules, 33, 1565 (2000).

Canelas, D.A., et al. "poly(vinyl acetate) and Poly(vinyl acetate–co–ethylene) Latexes via Dispersion Polymerization in Carbon Dioxide," Macromolecules, 31, 6794 (1998).

Bunyakan, C. and Hunkeler, D. "Precipitation Polymerization of Acrtlic Acid in Toluene. I: Synthesis, Characterization, and Kinetics," Polymer, 50, 6213 (1999).

Carlin, R.T. et al. "Studies of Ti(IV) Chloride in a Strongly Lewis Acidic Moleten Salt: Electrochemistry and Titanium NMR and Electronic Spectroscopy," Inorganic Chemistry, 29, 3003 (1990).

Goldberg, L.M. and Osteryoung, R.A. "Benzene Polymerization in 1–ethyl–3–methylimidaxolium chloni–AlCl3 Ionic Liquid," Synthetic Metals, 64, 63 (1994).

Holbrey, J.D. and Seddon, K.R. "Alternating copolymerisation of styrene and carbon monoxide in ionic liquids," Green Chemistry, 4(2), 143 (2002).

Bonhote, P. et al. "Hydrophobic, Highly Conductive Ambient Temperature Molten Salts," Inorganic Chemistry, 35, 1168 (1996).

Huddleston, J.G. et al. "Room temperature ionic liquids as novel media for 'clean' liquid–liquid extraction," Chem. Commun, 1765 (1998).

Visser, A.E. et al. "Calixarenes as Ligands in Environmentally–Benign Liquid/Liwuid Extraction Media" in Calixarene Molecules for Separations, American Chemical Society, 2000.

Visser, A.E. et al. "pH–Dependent Partitioning in Room Temperature Ionic Liquids," Green Chemistry, I, 1 (2000).

Scott, R.A. and Peppas, N.A. "Kinetic Study of Acrylic Acid Solution Polymerization," AIChE Journal, 43, 135 (1997).

Hawker, C.J. "Living Free Radical Polymerization: A Unique Technique for the Preparation of Controlled MAcromolecular ARchitectures," Acc. Chem. Res., 30, 373 (1997).

Patten, T.E. and Matyjaszewski, K. "Copper (I) –Catalyzed Atom Transfer RAdical Polymerization," Acc. Chem. Res., 32, 895 (1999).

Georges, M.K. et al. "TAming the Free–Radical Polymerization Process," Trends in Polymer Science, 2, 66 (1994).

Georges, M.K. et al. "Narrow Polydispersity Polystyrene by a Free–Radical Polymerization Process—Rate Enhancement," Macromolecules, 27, 7228 (1994).

Kafetzopoulos, C. et al. "Synthesis of Block Terpolymers of N–MethylMethcrylamide with Styrene and Isoprene by Living Radical Polymerization," Polymer Internation, 47, 226 (1998).

Correa, R.G. et al. "Emulsion Polymerization in a Microwave Reactor," Polymer, 39, 1471–1474 (1998).

* cited by examiner

Figure 5: Phase diagram for [bmim][PF6] and K3PO4
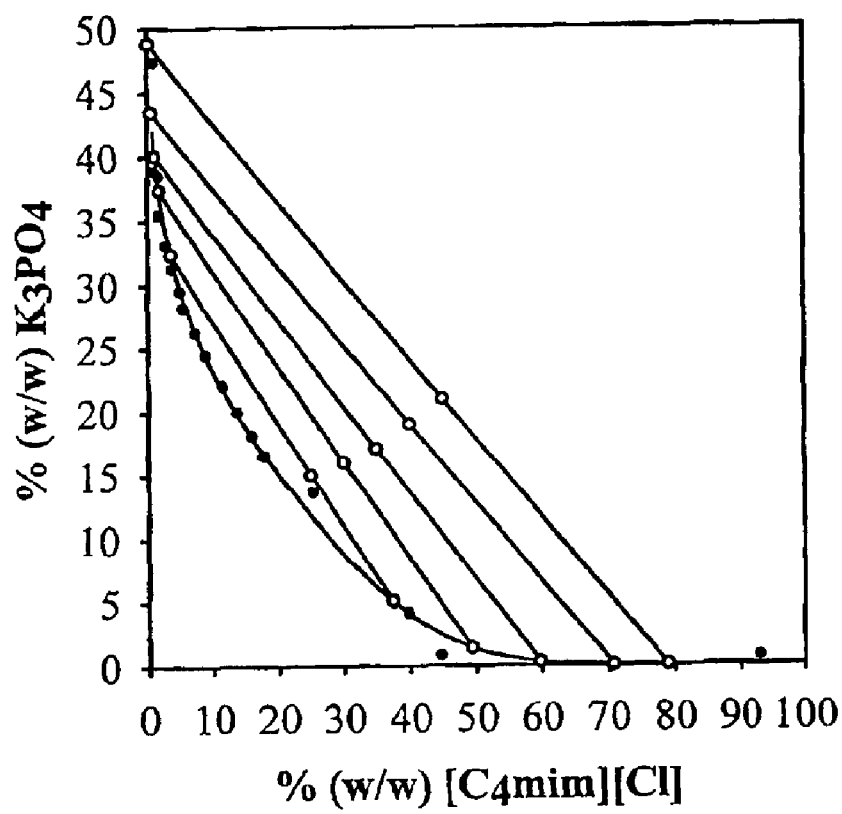

POLYMER FORMATION IN ROOM TEMPERATURE IONIC LIQUIDS

GRANT REFERENCE

Research related to this invention was supported by NSF grant CTS-0086874.

FIELD OF THE INVENTION

The present invention is directed to compositions and methods for forming polymers. More particularly, the invention is directed to compositions and methods for forming polymers in an ionic medium liquid at room temperature.

BACKGROUND OF THE INVENTION

One of society's biggest challenges as we enter the new milleunium is the elimination of industrial pollution. This high level of consumption continues despite new international treaties that severely limit the amount of volatile organic compounds (VOC) that can be released in plant effluents. The abbreviation VOC has become synonymous with a plethora of social, economic, and ecological hazards. It is thus imperative that the research community explores alternatives to VOCs and develops alternative processes that reduce the health risks, safety concerns, and environmental issues associated with current industrial solvents.

One of the largest segments of the chemical industry is the polymer industry, with over 30 million tons of polymers produced annually. A major component of industrial waste in this industry is used solvent, and strategies for eliminating solvent vapors will have huge importance in cleaning up industrial production of polymers. While aqueous reaction media are widely used (emulsion and suspension polymerization), not all polymerizations are amenable to these conditions, and solution polymerization using VOCs is still widely practical. At the workshop on The Role of Polymer Research in Green Chemistry and Engineering, sponsored by the National Environmental Technology Institute and held at the University of Massachusetts on Jun. 11–12, 1998, the use of supercritical fluids and RTILs (Room Temperature Ionic Liquids) as alternative media for polymerization was proposed. To our knowledge, only the former alternative has been systematically explored.

Recently, DeSimone and co-workers (J. L. Kendall et al.; D. A. Canelas et al.; K. A. Shaffer et al.) have developed the use of supercritical $CO_2$ as an alternative medium for polymerization. Since most industrially important hydrocarbon-based polymers are relatively insoluble in $CO_2$, heterogeneous polymerization techniques are often required. Dispersion polymerizations, characterized by soluble monomers, initiators, and surfactants but insoluble sterically-stabilized polymer products, have been successfully conducted in supercritical $CO_2$ for methylmethacrylate (Y.-L. Hsiao et al.; J. M. DeSimone et al.; Y.-L. Hsiao et al.; K. A. Shaffer et al.; M. L. O'Neill et al.; M. L. O'Neill et al.; C. Lepilleur et al.; T-M Yong et al.), styrene (D. A. Canelas et al.; D. A. Canelas et al.; H. Shiho et al.), divinylbenzene (A. I. Cooper et al.), acrylonitrile (H. Shiho et al.), and vinyl acetate (D. A. Canelas et al.; J. S. Shih; J. S. Shih et al.; C. Bunyakan et al.). A key to successful dispersion polymerization in $CO_2$ has been selection/synthesis of suitable polymeric stabilizers (usually copolymers) (J. L. Kendall et al.; D. A. Canelas et al.; K. A. Shaffer et al.). It should be noted that precipitation polymerization, which is identical to dispersion polymerization except the particles are not stabilized, is also a widely practiced technique even for water soluble polymers (J. S. Shih; J. S. Shih et al.; C. Bunyakan et al.).

The free radical polymerization process is a key process for the polymer synthesis industry. Robust and economical, it accounts for about 50% of all mass-produced polymers. (C. H. Bamford) One of the major virtues of radical polymerization is that it is relatively insensitive to monomer and solvent impurities, thus these polymerizations can be carried out under relatively undemanding conditions as compared to ionic polymerizations. Another advantage of this process is its ability to be applied to a wide range of monomers. The study of free radical polymerizations has been boosted recently by the development of variety of "living" techniques. (C. J. Hawker; J. S. Wang et al.; M. Sawamoto et al.)

Methods for synthesizing and using block copolymers is also of great interest, academically and industrially. This is particularly due to their spontaneous self-assembly into well-ordered nano-domains, which is a result of the combined effects of mutual repulsions between incompatible chain segments and the constraints imposed by the connectivity of the blocks. (H. Narita et al.) Many methods are available to synthesize well-defined block copolymers, including anionic, cationic and controlled ("living") radical polymerization. However, these polymerizations are done in volatile organic solvent media, which has been blamed for the increasing air pollution.

Over the past several years, RTILs have stimulated much interest among chemistry community for their potential as green "designer solvents" and several excellent reviews are available recently. (Y. Chauvin et al.; P. Wasserscheid et al.; T. Welton; J. D. Holbrey et al.; R. L. Hussey; R. T. Carlin et al.) RTILs not only show potential for use in separations and as electrolytes, but they are also promising solvents for chemical syntheses and particularly for catalysis, including their applications in polymerizations.

In the early 1990s, several polymerization studies were done in chloroaluminate based ionic liquids. Carlin and Wilkes (R. T. Carlin et al.; R. T. Carlin et al.) in 1990 observed polymerization of ethylene during two studies of titanium chemistry in chloroaluminate (III) ionic liquids to which alkylchloroaluminate (III) drying agents had been added. Carlin and coworkers (R. T. Carlin et al.) investigated the electrochemistry of $TiCl_4$ in $AlCl_3$-1-ethyl-3-methylimidazolium chloride (ImCl) melt and they found the combination of $TiC_4$ and $AlEtCl_2$ in $AlCl_3$-ImCl to be catalytic active for ethylene polymerization. Even though the yield of polyethylene was very low, they demonstrated that an RTIL could serve as polymerization medium. Using $Cp_2TiCl_2$ instead of $TiCl_4$, higher yields of polyethylene were achieved as reported by Carlin and Osteryoung. (R. T. Carlin et al.) The electrochemical polymerization of benzene in various ionic liquids to prepare poly(p-phenylene) has also been reported. (D. C. Trivedi; V. M. Kobryanslii et al.; L. M. Goldenberg et al.; S. A. Arnautov; R. T. Carlin et al.) In these studies, ionic liquids were used mainly as convenient electrolytes. Carlin and Osteryoung (V. M. Kobryanskii et al.) produced a new electroactive material by electrochemical oxidation of triphenylsilyl chloride ($Ph_3SiCl$) in acidic ionic liquid ($AlCl_3$-ImCl). The film exhibits reversible redox behavior and is electronically conducting in oxidized state. They postulated that the cations of the ionic liquids took part in the formation of the film. However, one of the major drawbacks of chloroaluminate(III) based ionic liquids is that they are water-sensitive.

An alternate technique, "living" radical polymerization, offers great control over molecular architecture, molecular weight, and molecular weight distribution (C. J. Hawker; M. Sawamoto et al.; T. E. Patten et al.). Nitroxide-mediated polymerizations, using additives like TEMPO (2,2,6,6-tetramethylpiperidinoxy), are generally sluggish and require long polymerization times in bulk monomer at elevated temperatures (ca. 125° C.) for 2–3 days (M. K. Georges et al.). Transition metal (Ru (II) or Ni (II)) catalyzed and Cu (I) catalyzed atom transfer radical polymerizations generally proceed at lower temperatures (M. Sawamoto et al.; T. E. Patten et al.) and are usually run in VOCs. By use of additives such as camphorsulfonic acid (M. K. Georges et al.) or acylating agents (C. J. Hawker), the kinetics of TEMPO systems can be greatly accelerated. Thus all of these initiator systems can now be employed in solution (M. Sawamoto et al.). C. Kafetzopoulos et al. reported the synthesis of block terpolymers in such a "heterogeneous living radical polymerization". In heterogeneous radical polymerization of certain monomers, the lifetimes of the propagating radicals can be extended from milliseconds (for homogeneous systems) to a few hours by trapping them in insoluble polymer particles (C. Kafetzopoulos et al.; T. Sato et al.). Block terpolymers of N-methyl methacrylamide (NMeMA) with styrene and isoprene were synthesized by heterogeneous radical polymerization of NMeMA followed by addition of the other monomers (C. Kafetzopoulos et al.). The existence of living macroradicals was confirmed by electron paramagnetic resonance spectroscopy (EPR); the formation of block copolymers was confirmed by differential scanning calorimetry (DSC) and infrared (IR) spectroscopy (C. Kafetzopoulos et al.). Recently, Carmichael et al. used 1-butyl-3-methylimidazolium hexafluorophosphate ([Bmim]$PF_6$, also known as [$C_4$mim]$PF_6$), an air and water-stable RTIL, as a solvent for the Cu(I)-N-propyl-2-pyridylmethanimine mediated "living" radical polymerization of methyl methacrylate (MA). They found that the rate of polymerization is enhanced as compared to other polar/coordinating solvents, even though the molecular weight of the resulting poly (methyl methacrylate) (PMMA) is low. Moreover, the polymer recovered is made essentially copper free by a simple solvent wash, which avoids the contamination of the polymer product by the catalyst.

Regarding copolymers, Guerrero et al. described the synthesis of polystyrene-b-poly(ethylene oxide) (PS-b-PEO) using a macroinitiator process. The PS and PEO blocks were linked via bridges containing bezopinacole groups. Since then several other studies have appeared in the literature. (H. Narita et al.; B. Hazer et al.; S. Nagarajan et al.; R. B. Seymour et al.) Narita and coworkers synthesized block copolymers of styrene and methyl methacrylate (MMA) (PS-b-PMMA) by using a polystyrene (PS) macroinitiator obtained through oxidation of imino functionalized PS. (H. Narita et al.) This functional PS was prepared by using 2,2'-azobis[(2-imidazolin-2-yl)propane] dihydrochloride as the initiator for styrene polymerization. Hazer and coworkers obtained PS-b-PMMA block copolymers through a polymeric peroxycarbamate compound. (B. Hazer et al.) Nagarajan and Srinivasan obtained poly(acrylonitrile)-b-poly(ethylene glycol)-b-poly(acrylonitrile) (PAN-b-PEG-b-PAN) block copolymers from a ceric ion redox process. (S. Nagarajan et al.) All these macroinitiator processes require post-polymerization reactions to activate the "protected" radical initiator. Seymour et al. reported high levels of block copolymer formation when macroradicals were produced in viscous poor solvents, e.g. silicone oils. (R. B. Seymour et al.; R. B. Seymour et al.; Stahl, G. A. et al.) To minimize the production of free radicals that would produce homopolymer of the second monomer, they kept the system at 50° C. for 96 hours prior to addition of the second monomer (2,2'-azobis(isobutyronitrile) (AIBN) was used as initiator). More recently, Kafetzopoulos et al. prepared block terpolymers of N-methyl methacrylamide (NMeMA) with styrene and isoprene (PNMeMA-b-PS-b-PI and PNMeMA-b-PI-b-PS) by heterogeneous radical polymerization in benzene. P. E. J. Louis et al. have raised doubts about the trapped radical mechanism, suggesting that residual primary radicals could result in a mixture of graft and statistical copolymers being formed. Noda and Watanabe have described the formation of polymer-in-salt electrodes, formed by in-situ polymerization of vinyl-monomers in ILs.

Thus, while many polymerization strategies have been explored, there is an ongoing need for environmentally responsible methods of polymerization.

SUMMARY OF THE INVENTION

A process for polymer formation is provided that includes the steps of combining a monomer, an initiator and an ionic liquid to obtain a mixture, bringing the mixture to a temperature and incubating the mixture at the temperature for a period of time sufficient for a polymerization reaction to occur. In a preferred option, the ionic liquid includes an organic cation and has a melting temperature between −100° C. and 200° C. An inventive process may further include the steps of isolating a polymer from the mixture and/or recovering the ionic liquid. Optionally, the initiator included in the mixture is a free radical initiator. An inventive process may include the step of removing oxygen from the mixture.

The present invention provides a process for polymer formation that includes the step of incubating a monomer in an ionic liquid at a temperature for a period of time sufficient for a polymerization reaction to occur. Preferably, the ionic liquid includes an organic cation and has a melting temperature between −100° C. and 200° C. An inventive process may further include the steps of isolating a polymer from the mixture and/or recovering the ionic liquid. Optionally, the initiator included in the mixture is a free radical initiator. An inventive process may include the step of removing oxygen from the mixture.

In another embodiment a process of polymer formation is provided that includes the steps of combining a first monomer, an initiator and an ionic liquid to obtain a mixture; bringing the mixture to a first temperature; incubating the mixture at the first temperature for a first period of time sufficient for a polymerization reaction to occur; removing an unreacted monomer from the mixture; adding a second monomer to the mixture; bringing the mixture to a second temperature; and reacting the mixture for a second period of time sufficient for a polymerization reaction to occur. The process includes an optional step of terminating a polymerization reaction in the mixture. An inventive process may further include the steps of isolating a polymer from the mixture and/or recovering the ionic liquid. Optionally, the initiator included in the mixture is a free radical initiator. An inventive process may include the step of removing oxygen from the mixture.

The present invention provides a polymerization mixture comprising that includes a polymer, and an ionic liquid having an organic cation.

BRIEF DESCRIPTION OF THE DRAWING

FIG. 5 is graphical representation of a phase diagram.

DETAILED DESCRIPTION OF THE PREFERRED EMBODIMENTS

Figure 1A:
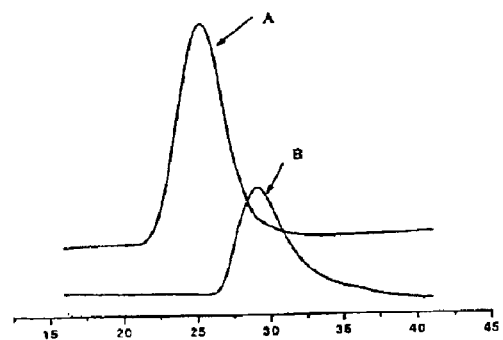
FIG. 1A is graphical representation of inventive polymer size exclusion chromatography characteristics.

There are many potential benefits that carrying out polymerization reactions in RTILs can provide. The replacement of VOCs by more environmentally benign solvents will have a significant impact on industrial operations if the polymerizations can be carried out safely, cheaply, and relatively quickly. The replacement of ethylbenzene, which is used in styrene polymerizations, with RTILs, not only reduces VOC emissions, but also reduces health hazards in working with the toxic solvent.

Some of the potential benefits of working with RTIL as solvents are listed below:

- high conversion and low residual monomer after reaction.
- improvements in polymer physical properties, such as tensile strength, due to the high molecular weights.
- allows work with enzymes, proteins or other biologically active components which are not stable in most organic solvents.
- high reaction temperatures useful since volatility of solvent is not a limiting factor with RTILs.
- polymerization techniques such as microwave heated reactions without the worry of solvent loss due to evaporation.

RTILs can be separated easily from formed polymers and recycled.

RTILs lead to improved control over molecular architecture for block copolymers and other tailored architectures.

RTILs may reduce chain transfer constants during free radical polymerization.

- rapid polymerization of high molecular weight polymers compared to polymers synthesized in a non-RTIL medium under otherwise similar reaction conditions.

Polymer Synthesis in RTIL (Room Temperature Ionic Liquid)

The present invention provides a process for forming a polymer in an ionic medium liquid at room temperature. In a preferred embodiment, a process of the present invention includes the step of incubating a monomer with an initiator in an ionic liquid at a temperature for a period of time sufficient for a polymerization reaction to occur. The polymerization reaction is terminated by a method such as by precipitation, inactivation and/or removal of a reaction component. The polymer is then isolated from unreacted monomer, initiator and RTIL. The polymer may be subsequently dried, for example, under vacuum.

Preferably, the monomer and initiator are incubated together in the absence of oxygen. For example, oxygen is removed by degassing reaction components and/or performing the polymerization under vacuum.

In a further optional step, the RTIL is recovered following removal of polymer product.

Copolymer Formation

Copolymers synthesized by the process of the present invention illustratively include diblock copolymers, triblock copolymers, multiblock copolymers, graft copolymers, star polymers, and polymers with specific functional end groups.

The present invention provides a process for forming a copolymer in an ionic medium liquid at room temperature. A preferred embodiment, a process of chemical synthesis includes the step of adding a first monomer and an initiator to an ionic liquid and incubating the mixture at a first temperature for a period of time sufficient for a polymerization reaction to occur. Preferably, unreacted monomer is removed before a second or subsequent monomer addition. Then a second monomer is added to the mixture and the resulting second mixture is incubated at a second temperature for a second period of time sufficient for a second polymerization reaction to occur. The first and second temperatures may be the same or different, depending on the reaction desired. The polymerization reaction is terminated by a method such as by precipitation, inactivation and/or removal of a reaction component. The copolymer is then isolated from unreacted monomer, initiator and RTIL. The copolymer may be subsequently dried, for example, under vacuum.

Optionally, the monomer and initiator are incubated together in the absence of oxygen. For example, oxygen is removed by degassing reaction components and/or performing the polymerization under vacuum.

In a further optional step, the RTIL is recovered following removal of copolymer product.

In another preferred embodiment, multiblock copolymers are formed by subsequent addition and incubation of monomers. For example, a triblock monomer is formed by mixing a first monomer and an initiator in an ionic liquid and incubating the mixture at a first temperature for a period of time sufficient for a polymerization reaction to occur. Then a second monomer is added to the first mixture and the resulting second mixture is incubated at a second temperature for a second period of time sufficient for a polymerization reaction to occur. A third monomer is added to the second mixture and the resulting third mixture is incubated at a third temperature for a third period of time sufficient for a polymerization reaction to occur. Temperatures used for the sequential polymerization steps may be the same or different depending on the desired reaction.

The molecular weight of a desired polymer or copolymer product depends on reaction conditions such as, for example, incubation time, temperature and monomer:initiator ratio. Generally, weight average molecular weight of a polymer product of the present invention ranges between about 5000 g/mol and 1,000,000 g/mol.

Typical monomer:initiator ratios are presented in Tables 1 and 5. These ratios may be higher or lower by an order of magnitude depending on the specific reaction conditions desired.

Solubility

An inventive polymerization process exploits the differential solubility of a monomer and a polymer product in an RTIL. Thus, for a particular RTIL to be appropriate for a particular polymerization reaction, the desired product polymer is less soluble than the monomer in the RTIL. Typically, a polymer product is soluble in an RTIL suitable for use in an inventive process to an extent less than one gram per milliliter, preferably less than one gram per liter. For example, polystyrene and poly(tert butyl acrylate are insoluble in [$C_4$mim]$PF_6$ though PMMA is soluble. Thus, synthesis of PS-b-PMMA in an inventive process including a first step of PS polymerization in [$C_4$mim]$PF_6$ yields PS-b-PMMA as the major product. Synthesis of PMMA-b-PS copolymers under the same conditions is less successful because PMMA has better solubility in [$C_4$mim]$PF_6$.

Thermal Polymerization

In another preferred embodiment, the present invention provides a process for forming a polymer in an RTIL by sequential polymerization steps at a desired temperature for times sufficient for a polymerization reaction to occur. In this embodiment, a monomer is incubated without an added initiator. The temperature of incubation depends on the monomer used and will be evident to one of skill in the art. The monomer is incubated at a temperature ranging from 15° C. to 250° C. More preferably the temperature of monomer incubation will range from 25° C. to 200° C. Still more preferably the temperature of monomer incubation will range from 50° C. to 200° C. Then, a second monomer is added and the resulting mixture is incubated at a second temperature for a second time. The second temperature of incubation depends on the monomer used and will be evident to one of skill in the art. The mixture is incubated at a temperature ranging from 15° C. to 250° C. More preferably the temperature of mixture incubation will range from 25° C. to 200° C. Yet more preferably the temperature of mixture incubation will range from 50° C. to 200° C. Further monomer addition and incubation steps result in triblock and multiblock copolymers.

Reaction Termination and Isolation of Product Polymer

Termination of polymerization reactions is known in the art and illustratively includes precipitation, inactivation and/or removal of a reaction component. In a preferred method, the reaction is terminated by precipitation. For example, a precipitating agent such as an alcohol or alcohol/water mixture is added to the reaction. Preferably, the RTIL is soluble in the precipitating agent.

Separation of Polymer

A process of the present invention includes a step of separation of a polymer product from a polymerization medium. Typically, a polymer product precipitates from the RTIL and residual RTIL, which can act as a plasticizer, may be removed by washing, for example with aqueous alcohol. Thus, an RTIL has the surprising effect of eliminating the need for the usual VOCs in precipitating a polymer product and removing reaction components from the polymer product.

Typically, an RTIL solvent may be removed to avoid plasticization and reduced mechanical properties. Methods to extract the remaining solvent include the use of water to cause phase separation between the RTIL and polymer. Although RTIL such as [$C_4$mim][$PF_6$] are immiscible with water, solutions of ethanol/water (78—99% composition by volume) are totally miscible with this RTIL. Further separation methods include addition of azeotropic ethanol/water to clean the RTIL phase and remove the RTIL phase from products.

On the laboratory scale, the insoluble polymer could be isolated by decanting off the RTIL. On an industrial scale, a better strategy could be to utilize dispersion polymerization strategies similar to those adopted by DeSimone and co-workers (J. L. Kendall et al.; D. A. Canelas et al.; K. A. Shaffer et al.; Y.-L. Hsiao et al.; J. M. DeSimone et al.; Y.-L. Hsiao et al.; K. A. Shaffer et al.; D. A. Canelas et al.; D. A. Canelas et al.; H. Shiho et al.; H. Shiho et al.; D. A. Canelas et al.; J. S. Shih; J. S. Shih et al.; C. Bunyakan et al.) for polymerization in super-critical $CO_2$. Alternatively, precipitation polymerization could be employed. In the case of PAA; which is soluble in hmim-$PF_6$, the polymer could be removed by extraction with water followed by freeze-drying.

The hydrophilic RTIL, [bmim][Cl], which is miscible with water, can be salted-out using a cosmotropic salt such as $K_3PO_4$. A phase diagram for this separation is provided in FIG. 5. Thus, a solute recovery scheme optionally involves reaction or dissolution in [bmim][Cl] followed by removal from the aqueous layer by adding a salt solution of sufficient concentration to form the biphasic system. This salting-out ability allows the use of less expensive RTIL, such as those with halide anions, as an extracting phase in liquid/liquid separation systems. These examples, illustrate methods of separating products or impurities from RTILs without resorting to the use of VOCs. After each separation, the residual RTIL may be determined using cryogenic DSC. Remaining unreacted monomer in the polymer samples may also be monitored, using UV/V is spectrophotometry.

Polymer samples will also be synthesized on a larger scale, as films.

Room Temperature Ionic Liquids

The present invention describes use of free radical addition polymerization in room temperature ionic liquids (RTILs). RTILs are non-volatile, non-flammable, have high thermal stabilities, and are relatively easy and inexpensive to manufacture. (P. Wasserscheid et al., Y. Chauvin et al.).

RTILs are salts that are liquid at room temperature and over wide ranges of temperature (for some this range may exceed 300° C.). The term "room temperature ionic liquid" as used herein is intended to refer to ionic liquids having melting points at elevated, but practically accessible, temperatures. For example, the melting point for a RTWL is typically between −100° C. to 200° C.

Typically, RTILs are organic salts or mixtures consisting of at least one organic component. RTILs are water-miscible or water-immiscible, and reactive or non-reactive with water and air depending on their structure. Choice of RTIL depends on desired monomer and polymer solubilities and physical properties. Variations in cations and anions can produce a very wide range of ionic liquids, thus allowing for fine-tuning of ionic liquid properties for specific applications. Choice of RTIL provides control of characteristics such as hydrophobicity in the first instance by changing the anion and then "fine-control" using the alkyl group on the cation. Cations are typically large, bulky, and asymmetric, and are a factor affecting the melting point of the IL. The anion contributes to the overall characteristics of the ionic liquid including such properties as the air and water stabilities. For example, [$PF_6$]$^-$ gives moisture-stable, water-immiscible ionic liquids, whereas [$BF_4$]$^-$ usually gives moisture-stable but water-miscible ionic liquids. The constituents of RTILs (being ionic) are constrained by high coulombic forces and thus exert practically no vapor pressure above the liquid surface.

Common examples of RTIL cations include large, asymmetric organic cations such as N-alkylpyridinium, alkylammonium, alkylphosphonium, and N,N'-dialkylmidazolium. Desirable properties of such cations in RTILs include stability. For example, dialkylmidazolium and alkylpyridinium have decomposition temperatures in excess of 400° C.

In such cations the alkyl group may be varied to fine-tune the physical properties of the RTIL. One example of preferred RTILs are the Rmim$^+$ salts of $PF_6^-$, due to ready availability of reagents, ease of synthesis and the ability to readily vary the alkyl chain length in the cation, affecting the physical properties of the RTIL. Rmim⁺ salts of $PF_6^-$ also have the advantages of convenient melting points and viscosities. The structure of 1-alkyl-3-methylimidazolium ([RMIM]PF₆) is shown below.

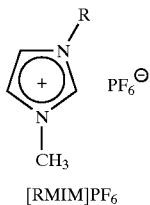

[RMIM]PF₆

R is illustratively $C_1$–$C_{15}$ alkyl, preferably $C_2$–$C_{10}$ alkyl. The melting points for the derivatives of [RMIM]PF₆ in which R is ethyl, butyl, hexyl, octyl, and decyl are 62°, 4°, −78°, −72°, and 37° C., respectively (J. D. Holbrey et al.; Y. Chauvin et al.; P. Bonhote et al.; A. B. McEwen et al.).

Within a single class of RTILs solvation characteristics may be readily varied by changing the nature of the alkyl group. For example, poly (methyl methacrylate) (PMMA) is insoluble in 1-butyl-3-methylimidazolium hexafluorophosphate (bmim-PF₆) but PMMA is soluble in 1-hexyl-3-methhylimidazolium hexaflurophosphate (hmim-PF₆). Table 1 shows molecular weights of the PMMA specimens prepared in bmim-PF₆ are considerably higher than molecular weights of specimens prepared in hmim-PF₆ at similar monomer to initiator ratios. Generally these molecular weights are also higher (by about 2–3×) than molecular weights of PMMA prepared with the same initiator in more conventional solvents.

TABLE 1

Polymer Synthesis in RTIL

| Run | mL, IL | mL, MMA | mg, AIBN | Temp., ° C. | $M_w \times 10^{-5}$ | $M_N \times 10^{-5}$ |
|---|---|---|---|---|---|---|
| Synthesis of PMMA in [bmim][PF₆]ᵃ | | | | | | |
| 1 | 9 | 1 | 1 | 70 | 7.61 | 3.71 |
| 2 | 9 | 1 | 5 | 70 | 6.94 | 3.40 |
| 3 | 9 | 1 | 30 | 70 | 5.03 | 2.44 |
| Synthesis of PMMA in [hmim][PF₆]ᵃ | | | | | | |
| 1 | 1.8 | 0.2 | 30 | 70 | 1.06 | 0.60 |
| 2 | 1.8 | 0.2 | 6 | 70 | 2.99 | 1.85 |
| Synthesis of PAA in [hmim][PF₆]ᵃ | | | | | | |
| Run | mL, IL | mL, AA | mg, AIBN | Temp., ° C. | $M_w \times 10^{-5}$ | $M_N \times 10^{-5}$ |
| 1 | 1.8 | 0.2 | 30 | 65 | 2.23 | 0.44 |
| 2 | 1.8 | 0.2 | 6 | 65 | 2.10 | 0.38 |
| 3 | 1.8 | 0.2 | 60 | 65 | 2.00 | 0.34 |

ᵃMolecular weights determined by size exclusion chromatography (SEC).

A matrix of RTILs providing hydrophilic, hydrophobic, and inexpensive materials is provided in Table 2. Also included is a class of less expensive RTILs that may be used as co-solvents to lower the overall cost of the solvent system. At least one quaternary ammonium salt is included for comparison (e.g., [Net₃H][Tf₂N] is an RTIL). RTIL anions include the Cl⁻ and $NO_3^-$ salts for hydrophilic RTIL, and $PF_6^-$ and $Tf_2N^-$ for hydrophobic RTIL. An advantage of the bistrifylimide (Tf₂N⁻) anion is that it gives viscosities and densities resembling water making it easy to work with.

TABLE 2

Matrix of RTIL Cations and Anions

| | H₃C–imidazolium-R | pyridinium-R | ⁺NR₃R |
|---|---|---|---|
| Cl⁻ | Easy to synthesize, hydrophilic | Easy to synthesize, hydrophilic | Inexpensive, hydrophilic |
| $NO_3^-$ | Anion can produce reactive RTIL | Hydrophilic | Inexpensive, hydrophilic |
| $PF_6^-$ | High thermal stability | Less thermally stable | Dopant RTIL to decrease cost |
| N(CF₃SO₂)₂⁻ | Low viscosity, hydrophobic, expensive | Hydrophobic | Low viscosity |

Mixtures of RTILs are contemplated and within the scope of the present invention. For example, [emim][Tf₂N] salts are expensive, but NEt₃H⁺ salts can be mixed into them producing a much less expensive RTIL, yet retaining most of the properties of the [emim][Tf₂N] RTIL. The mixtures are characterized to ascertain how this affects the physical properties, stabilities, solubilities, and other reaction properties.

Further examples of ionic liquids suitable for use in the present invention may be found in the T. Welton reference and in J. Mol. Catal., 1990, 63:125.

Monomers

Monomers used in synthesis of polymers and copolymers are known in the art illustrative examples of monomers useful in the process of polymerization of the present invention are unsaturated ethylene monomers illustratively including vinyl monomers, acrylamide monomers, acrylic monomers, allylic monomers and mono- and dicarboxylic unsaturated acids; vinyl esters illustratively including vinyl acetate, vinyl butyrates, vinyl isopropyl acetates, vinyl neodeconate and vinyl propionate; vinyl halides such as vinyl chloride, vinyl fluoride, and vinylidene chloride; vinyl aromatic hydrocarbons illustratively including styrene, alpha-methyl styrenes; acrylic monomers illustratively include acrylic and methacrylic acid, methyl acrylate, methyl methacrylate, ethyl acrylate, ethyl methacrylate, butyl acrylate, butyl methacrylate, propyl acrylate, propyl methacrylate, 2-ethyl hexyl acrylate, 2-ethyl hexyl methacrylate, cyclohexyl acrylate, cyclohexyl methacrylate, decyl acrylate, decyl methacrylate, isodecylacrylate, isodecylacrylate methacrylate, benzyl acrylate and benzyl methacrylate, other alkyl acrylates; and art recognized equivalents.

Initiators

In a preferred embodiment of the processes of the present invention, an initiator is used to initiate the polymerization reaction. The initiator to be used depends upon the monomers present in the reaction mixture and the choice of initiator and the amount required will be readily apparent to one of skill in the art. In a preferred embodiment of a process of the present invention, the initiator is a free radical. Particularly preferred are azobisisobutyronitrile (AIBN) or benzoyl peroxide. Solubility characteristics of an initiator in a particular RTIL are a factor in the choice of initiator.

Generally, free radical initiators are known in the art and illustratively include azo-based polymerization initiators such as 2,2'-azobisisobutyronitrile (AIBN) and 2,2'-azobis (cyclohexanecarbonitrile); peroxide-based polymerization initiators such as benzoyl peroxide; organic peroxides, hydroperoxides, persulfates and azo compounds such as, N,N,N',N'-tetramethylethylenediamine (TMEDA)/ammonium persulfate, methyl ethyl ketone peroxide, cumene hydroperoxide, potassium persulfate, lauroyl peroxide, 2,5-dimethyl-2,5-di(t-butylperoxy)hexane, diethyl peroxide, dipropyl peroxide, dilauryl peroxide, dioleyl peroxide, distearyl peroxide, di(tertiarybutyl) peroxide, di(tertiary amyl) peroxide, tertiary butyl hydroperoxide, tertiary amyl peroxide, acetyl peroxide, propionyl peroxide, lauroyl peroxide, stearoyl peroxide, malonyl peroxide, succinyl peroxide, phthaloyl peroxide, acetyl benzoyl peroxide, propionyl benzoyl peroxide, ascaridole, ammonium persulfate, sodium persulfate, sodium percarbonate, potassium percarbonate, sodium perborate, potassium perborate, sodium perphosphate, potassium perphosphate, tetralin hydroperoxide, tertiary butyl diperphthalate, tertiary butyl perbenzoate, 2,4-dichlorobenzoyl peroxide, urea peroxide, caprylyl peroxide, p-chlorobenzoyl peroxide, 2,2-bis(tertiary butyl peroxy)butane, hydroxyheptyl peroxide and art recognized equivalents.

Temperature

The temperature at which the monomer and initiator are incubated depends on the monomer and initiator used. The appropriate temperature will be readily apparent to one skilled in the art. Generally, the temperature will range from −50° C. to 200° C. More preferably the temperature of monomer incubation with the initiator will range from 0° C. to 100° C. Yet more preferably the temperature of monomer incubation with the initiator will range from 15° C. to 80° C.

In another preferred embodiment, the present invention provides a process for forming a polymer in an ionic liquid by thermal polymerization. In this embodiment, a monomer is incubated at a temperature ranging from 15° C. to 250° C. More preferably the temperature of monomer incubation will range from 25° C. to 200° C. Yet more preferably the temperature of monomer incubation will range from 50° C. to 200° C.

In an inventive process for forming a copolymer, multiple reaction steps may be performed at differing temperatures depending on the desired polymer product. Typically one should utilize higher temperatures and shorter times for polymerization of the first block relative to the second block. The higher temperature during formation of the first block promotes relatively rapid radical formation with initiators like BPO. The use of a much lower temperature during polymerization of the second monomer minimizes generation of new free radicals that would lead to homopolymer contaminants of the second monomer.

The first temperature at which the monomer and initiator are incubated depends on the monomer and initiator used. The appropriate first temperature will be readily apparent to one skilled in the art. The temperature is one at which the initiator is relatively active in generating free radicals. Generally, the first temperature will range from −50° C. to 200° C. More preferably the first temperature of monomer incubation with the initiator will range from 0° C. to 100° C. Yet more preferably the first temperature of monomer incubation with the initiator will range from 15° C. to 80° C.

The second temperature at which the second mixture is incubated depends on the monomers and initiator used. The second temperature is one at which the initiator is relatively inactive in generating free radicals. The appropriate second temperature will be readily apparent to one skilled in the art. Generally, the second temperature will be lower than the first temperature. For example, where the initiator is benzoyl peroxide or AIBN, the first temperature is preferably in the range of 50° C. to 100° C. More preferably where the initiator is benzoyl peroxide or AIBN, the first temperature ranges from 65° C. to 75° C. Where the initiator is benzoyl peroxide or AIBN, the second temperature is preferably in the range of −20° C. to 37° C. More preferably where the initiator is benzoyl peroxide or AIBN, the second temperature ranges from −5° C. to 5° C.

When synthesizing triblock or multiblock polymers the third and subsequent incubation temperatures will depend on the monomers and initiator used. The appropriate temperature will be readily apparent to one skilled in the art.

Incubation Time

The length of time for which the monomer is incubated at a temperature depends on the monomer used, on whether an initiator is used, which initiator is used and on the temperature of incubation. The appropriate time will be readily apparent to one skilled in the art. Samples of the reaction mixture may be removed from the reaction vessel from time to time to monitor reaction progress. Generally, the time will range from one to ten hours. More preferably the time of monomer incubation with the initiator will range from two to eight hours. Yet more preferably the time of monomer incubation will range from three to four hours.

For copolymer synthesis the incubation time of the various monomers in any of the various steps included in an inventive process will depend on the monomers and initiator used and the appropriate times will be apparent to one skilled in the art. Samples of the reaction mixture may be removed from the reaction vessel from time to time to monitor reaction progress. Generally, the first incubation period ranges from one to ten hours. More preferably the first period of monomer incubation with the initiator will range from two to eight hours. Yet more preferably the first period of monomer incubation will range from three to four hours. Generally, the second incubation period ranges from one hour to eight days. More preferably the second incubation period with the initiator ranges from eight hours to seven days. Yet more preferably the first period of monomer incubation will range from twelve hours to six days.

Characterization of Polymers

Polymers are characterized by size exclusion chromatography (SEC) and nuclear magnetic resonance (NMR) spectroscopy.

Polymerization kinetics are followed using differential scanning calorimetry to monitor exotherms (R. A. Scott et al.). The temperature of onset, integrated total energy of polymerization, time-length of reaction and conversion is determined by these experiments. RTILs are extremely thermally stable, up to 300° C. (M. Freemantle), so DSC can be used to observe polymerization exotherms separately from any thermal transitions in the solvent. Similar behaviors may be noted for RTILs, and the appropriate selection of monomer and solvent will allow for the best thermodynamic interactions to reduce chain transfer to solvent and increase the polymer molecular weight.

Tensile tests, using an Instron automated materials testing system (Model 4465, 5 kN load cell), are conducted on both unextracted and extracted polymer samples formed using both RTIL and conventional solvents. These experiments determine the tensile strength of polymer samples, as stress is monitored as a function of strain.

RTILs facilitate synthesis of high molecular weight polymers. The effect of chain transfer on number-average degree of polymerization, $X_n$, is given by Equation 1 (G. Odian):

$$\frac{1}{\overline{X}_n} = \frac{R_i}{2R_p} + C_M + C_S\frac{[S]}{[M]} + C_I\frac{[I]}{[M]} \quad (1)$$

where $R_i$=rate of initiation, $R_p$=rate of propagation, $C_M$, $C_S$ and $C_I$ represent the chain-transfer constants for monomer, solvent and initiator, respectively, and [M], [S], and [I] represent the concentrations of monomer, solvent and initiator, respectively. The chain transfer constant for the solvent can be determined by a series of reactions maintaining a constant monomer to initiator concentration ratio. Because RTILs accommodate long free radical lifetimes, the value of $C_S$ for polymerizations in RTILs is small. Some representative values of $C_S$ for polymerizations using carbon tetrachloride as the solvent are listed in Table 3. The wide degree of variance using the same solvent shows that acrylonitrile polymerizations are compatible with carbon tetrachloride, while poly(vinyl acetate) chains will be shorter due to chain transfer to the solvent.

TABLE 3

Chain Transfer Constants for selected monomers in carbon tetrachloride (J. Brandrup et al.).

| Monomer | Chain Transfer Constant, $C_S$ (×10$^4$) |
| --- | --- |
| Vinyl acetate | 10,700 |
| Acrylonitrile | 0.85 |
| Methyl methacrylate | 2.4 |
| Styrene | 110 |

Living Radical Polymerization

In addition to conventional free radical polymerization, living free radical polymerizations in RTIL solvents is contemplated.

In one example, a block copolymer of methylmethacrylate and acrylic acid using the PMMA/bmim-PF$_6$ system for growth of the first block. Unlike the metal or TEMPO-mediated living radical systems discussed earlier, these heterogeneous living radical systems will yield products that are polydisperse and which contain homopolymer impurities (first block, in the case of diblocks). Nevertheless, the capacity to make block copolymers of reasonable purity in such a cheap industrially compatible and "green" manner should prove extremely valuable. Block copolymers are analyzed by selective extraction, spectroscopy, SEC, and DSC. EPR and ESR will be used to monitor free radical lifetimes, following protocols such as those in Hadjichristidis et al. (C. Kafetzopoulos et al.).

EXAMPLES

Example 1

Materials

Styrene (Aldrich, 99%) and MMA (Aldrich, 99%) are distilled (to remove the inhibitors) and stored in calibrated ampoules. [Bmim]PF$_6$ (available from Sachem Inc., University of Alabama, or synthesized as reported in Huddleston et al.) is washed with pure water five times. Benzene (Fisher, ≧99%) and toluene (Fisher, ≧99.80%) are distilled from freshly crushed calcium hydride. BPO (Aldrich, 97%) and AIBN (Aldrich, 980%) are recrystallized from methanol.

Example 2

Instrumentation

Size exclusion chromatography (SEC) is used to determine molecular weights and molecular weight distributions, $M_w/M_n$, of polymer samples with respect to polystyrene standards (Pressure Chemical, Co.). The SEC experiments are carried out at 30° C. in TBF using a Waters 510 pump and Waters 410 differential refractometer detector (flow rate: 1 ml/min, columns: Waters 100 Å, 500 Å, 10$^3$ Å, 10$^4$ Å, 10$^5$ Å or columns:Polymer Standards Service; one 100 Å and one mixed bed "linear" column (10$^4$ to 10$^6$ MW) in series.

Example 3

Polymerization of Styrene in [Bmim]PF6

FIG. 1A shows the SEC traces of PS (A) from styrene (1.5 mL) polymerized by BPO (5 mg) in [Bmim]PF$_6$ (15 mL) at 75° C. for 8 hr, Mp~800 kg/mol, $M_w/M_n$~2.2; (B) from styrene (6.2 mL) polymerized by BPO (20 mg) in benzene (40 mL) at 75° C. for 15 hr; Mp~231 kg/mol, $M_w/M_n$~2.5. Even though all the reaction conditions were almost the same, the molecular weight of PS obtained from BPO in [Bmim]PF$_6$ is much higher than that obtained from BPO in benzene. The polymer separates from the reaction mixture because of the poor solubility of PS in [Bmim]PF$_6$.

Example 4

Polymerization of MMA in [Bmim]PF6

Figure 1B:
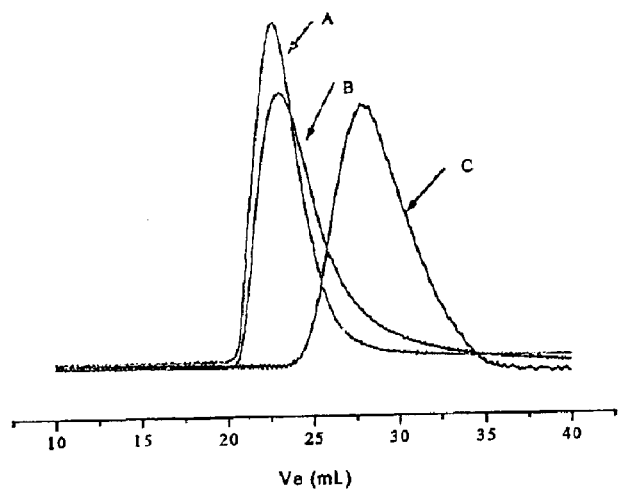
FIG. 1B is graphical representation of inventive polymer size exclusion chromatography characteristics.

The polymerization of MMA in [Bmim]PF$_6$ is similar to that of styrene and the reaction even faster. FIG. 1B shows SEC traces of PMMA (A) from MMA (1 mL) polymerized by AIBN (10 mg) in [Bmim]PF$_6$ (10 mL) at 65° C. for 6 hr, Mp~970 kg/mol, $M_w/M_n$~1.7; (B) from MMA (1 mL) polymerized by BPO (10 mg) in [Bmim]PF$_6$ (10 mL) at 75° C. for 8 hr, Mp~880 kg/mol, $M_w/M_n$~1.9; (C) from MMA polymerized by BPO (10 mg) in benzene (10 mL) at 75° C. for 6 hr; Mp~113 kg/mol, $M_w/M_n$~2.6. PMMA from AIBN in [Bmim]PF$_6$ even gave higher molecular weight as compared to that from BPO. PMMA is not soluble in [Bmim]PF$_6$, facilitating separation of product.

Example 5

Microstructures (Tacticities) of PS and PMMA.

Figure 1C:
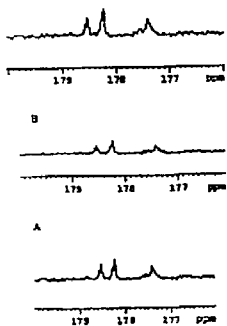
FIG. 1C is graphical representation of inventive polymer nuclear magnetic resonance characteristics.

The taciticity of the PS and PMMA obtained from [Bmim]PF$_6$ is analyzed by $^{13}$C NMR spectra. The tacticity of PS is almost the same as that produced from conventional radical polymerization, and that from anionic polymerization as well (not shown). FIG. 1C shows $^{13}$C NMR spectra of PMMA (carbonyl regions) (A) from AIBN in [Bmim]PF$_6$; (B) from BPO in [Bmim]PF$_6$; (C) from BPO in benzene indicating the taciticities of PMMA obtained from various radical polymerizations.

Example 6

Co-Polymerization

Polymerizations are done under high vacuum to ensure the systems are oxygen free. After charging certain amount of initiator (BPO or AIBN) and [Bmim]PF$_6$ into a round bottom flask with a constriction, the system is degassed for 2 hr, and a pre-defined quantity of monomer (styrene or MMA) is distilled into the reactor. Then the flask is removed from the vacuum line and kept in a pre-heated oil bath (65° C. for AIBN and 75° C. for BPO). The polymerization is allowed to continue for about 4~8 hr. In the case of copolymerizations, the reactions of the first monomer are allowed to continue for about 4 hrs. After taking about 5 mL of solution for sampling, the unreacted monomer is pumped away on the vacuum line at room temperature. A pre-determined quantity of the second monomer) is then distilled into the system, and the reaction is kept at room temperature for 4 to 6 days. The polymerizations are stopped by precipitation into methanol ([Bmim]PF$_6$ soluble in methanol). The polymers are isolated by washing with methanol ([bmim]PF$_6$ is soluble in methanol), and dried under vacuum.

Styrene is polymerized first in [C$_4$mim]PF$_6$ at 70° C. with BPO as the initiator for about 4 hrs. The polymerization is cooled to room temperature and unreacted monomer (styrene) is pumped away under high vacuum. A small aliquot (~5 mL) is taken to characterize the PS block. When the elimination of the styrene is completed, as indicated by the recovery of the initial vacuum, a certain amount of purified MMA (the second monomer) is then introduced by distillation through the vacuum line. The reactor is sealed off and kept at room temperature for 4 days. Room temperature (r.t.) is indicated as a second reaction temperature in this example. Room temperature in this context typically ranges from 15° C. to 30° C. The use of a long reaction time and lower temperature is chosen to minimize the effect of residual BPO on the products. The crude block copolymer is extracted with cyclohexane to remove PS and with acetonitrile to remove PMMA homopolymers. The results are summarized in Table 4.

TABLE 4

Characteristics of preparation of PS-b-PMMA from BPO at 70° C. in [C4mim]PF6

| | PS block | | Block copolymer | | Composition (St mol %)[b] | | |
|---|---|---|---|---|---|---|---|
| Polymer | $M_w^a \times 10^{-3}$ | $M_w/M_n^a$ | $M_w^a \times 10^{-3}$ | $M_w/M_n^a$ | Found | Expected | Yield (%) |
| S3M1 | 38.9 | 3.67 | 211 | 2.52 | 59.9 | 73.4 | 51.1 |
| S1M1 | 55.7 | 2.52 | 809 | 2.38 | 38.4 | 48.3 | 50.3 |
| S1M3 | 43.4 | 2.67 | 677 | 2.49 | 11.4[c] | 23.4 | 47.4 |

[a]From SEC (calibrated with PS standards);
[b]Composition of extracted block copolymers, obtained from $^1$H-NMR;
[c]From SEC with dual detectors (RI, UV).

Example 7

PS-b-PMMA Block Copolymers From BPO in [Bmim]PF$_6$.

Polymerizations are done under high vacuum to ensure that the systems were oxygen free. After charging desired amounts of initiator (BPO) and solvent ([C$_4$mim]PF$_6$) into a round bottom flask with a constriction, the system is degassed by pumping on the vacuum line for 2 hrs and a predetermined quantity of monomer (styrene, MMA) is then distilled into the reactor. The flask is removed from the vacuum line by heat-sealing at the constriction and placed in a pre-heated water bath at 70° C. The polymerization is allowed to continue for about 4 hrs. After taking about 5 mL of solution for sampling, the unreacted monomer is pumped away on the vacuum line at room temperature. The non-volatile nature of the RTIL facilitated this process. A pre-determined quantity of the second monomer (MMA) is then distilled into the system, and the reaction is kept at room temperature for 4 to 6 days. The polymers are isolated by washing with methanol ([C$_4$mim]PF$_6$ is soluble in methanol), and dried under vacuum.

The basic approach to preparing PS-b-PMMA is as follows:

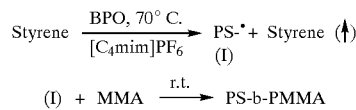

Figure 2A:
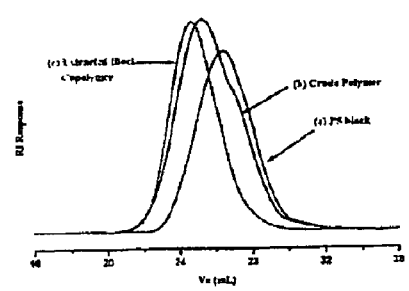
FIG. 2A is graphical representation of inventive polymer size exclusion chromatography characteristics.

FIG. 2A shows SEC traces for block copolymerization of styrene and MMA. The SEC traces are of (a) PS block from BPO in [bmim]PF$_6$, (b) PS-b-PMMA before extraction, (c) PS-b-PMMA (S3M1 in Table 4) after extracting with cyclohexane (to remove PS) and acetonitrile (to remove PMMA). Although there may be PS homopolymer present in the un-extracted raw block copolymers, the product is mostly block copolymer. Cyclohexane (solvent for PS and non-solvent for PMMA) is used to remove PS homopolymer. Extraction the block copolymers using acetonitrile (solvent for PMMA and non-solvent for PS) shows no polymer in acetonitrile solution in most cases, which indicates there is negligible PMMA homopolymer present. This demonstrates an advantage of choosing an appropriate reaction temperature since the fact that the rate of decomposition of any residual BPO to generate free radicals is essentially zero at room temperature contributes to the relative absence of homopolymer. The half-life of BPO (t$_{1/2}$) at 25° C. is more than 45,000 hrs as calculated from the Arrhenius equation (K$_d$=A exp(−Ea/RT) and the initiation rate equation (t$_{1/2}$=ln 2/K$_d$), with Ea=139.0 kJ mol$^{-1}$, R=8.314 J mol$^{-1}$ K$^{-1}$ and A=9.34 10$^{15}$ s$^{-1}$.$^{25}$ When the feed ratio of styrene to MMA is 1:3, a small low molecular weight peak (M$_n$~4 kg/mol) appeared in the SEC traces of raw copolymer and the cyclohexane-extracted product. This peak can be washed away using acetonitrile, which confirms that it is PMMA homopolymer. The mono-modal character of the SEC trace of extracted crude polymer indicates, to a certain extent, the homogeneity of the final blocky copolymers. The polymers are characterized further by using NMR and fractional precipitation.

It should be noted that the actual amount of PS homopolymer is exaggerated in FIG. 2A because the dn/dc value for PS in THF (dn/dc$_{PS}$=0.189 ml/g) is higher than that for PMMA (dn/dc$_{PMMA}$=0.089 ml/g). (Polymer Handbook)

Example 8

Figure 2B:
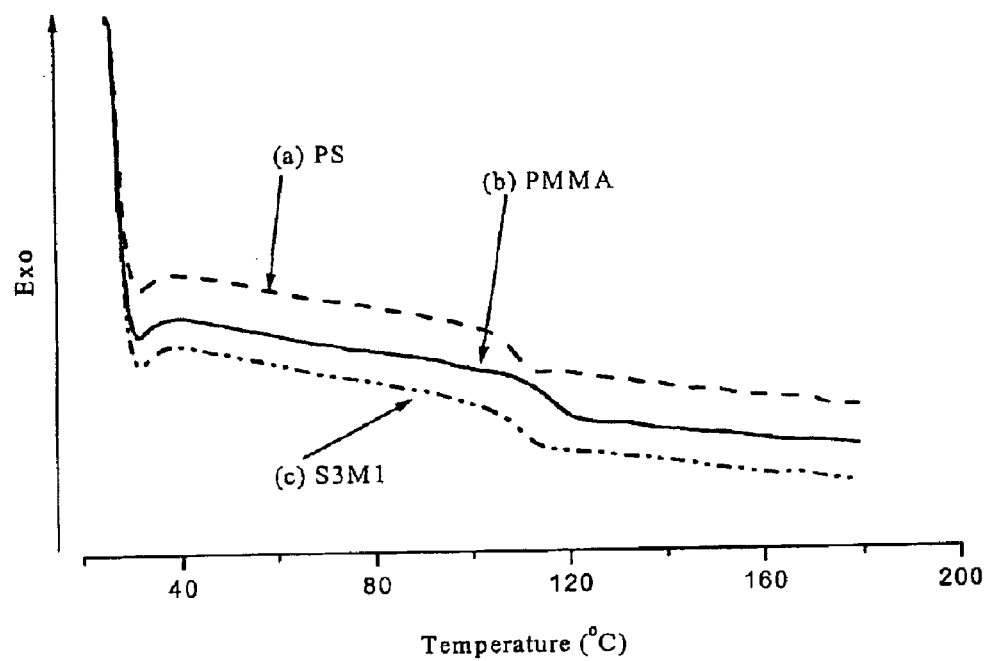
FIG. 2B is graphical representation of inventive polymer differential scanning calorimetry characteristics of (a) PS, (b) PMMA and (c) PS-b-PMMA denoted as S3M1.

FIG. 2B shows the DSC traces for PS-b-PMMA and along with PS and PMMA homopolymers (all three polymers have similar molecular weight). The DSC traces are of (A) PS from BPO in [bmim]PF$_6$, (b) PMMA from BPO in [bmim]PF$_6$, (c) PS-b-PMMA after extracting with cyclohexane and acetonitrile. It is expected that there should be two distinct glass transitions (Tg) corresponding to PS and PMMA blocks, whereas a random copolymer should exhibit a single intermediate Tg. However, the Tgs for PS and PMMA blocks are too close to be resolved and a single somewhat broader transition is observed.

Example 9

Figure 3:
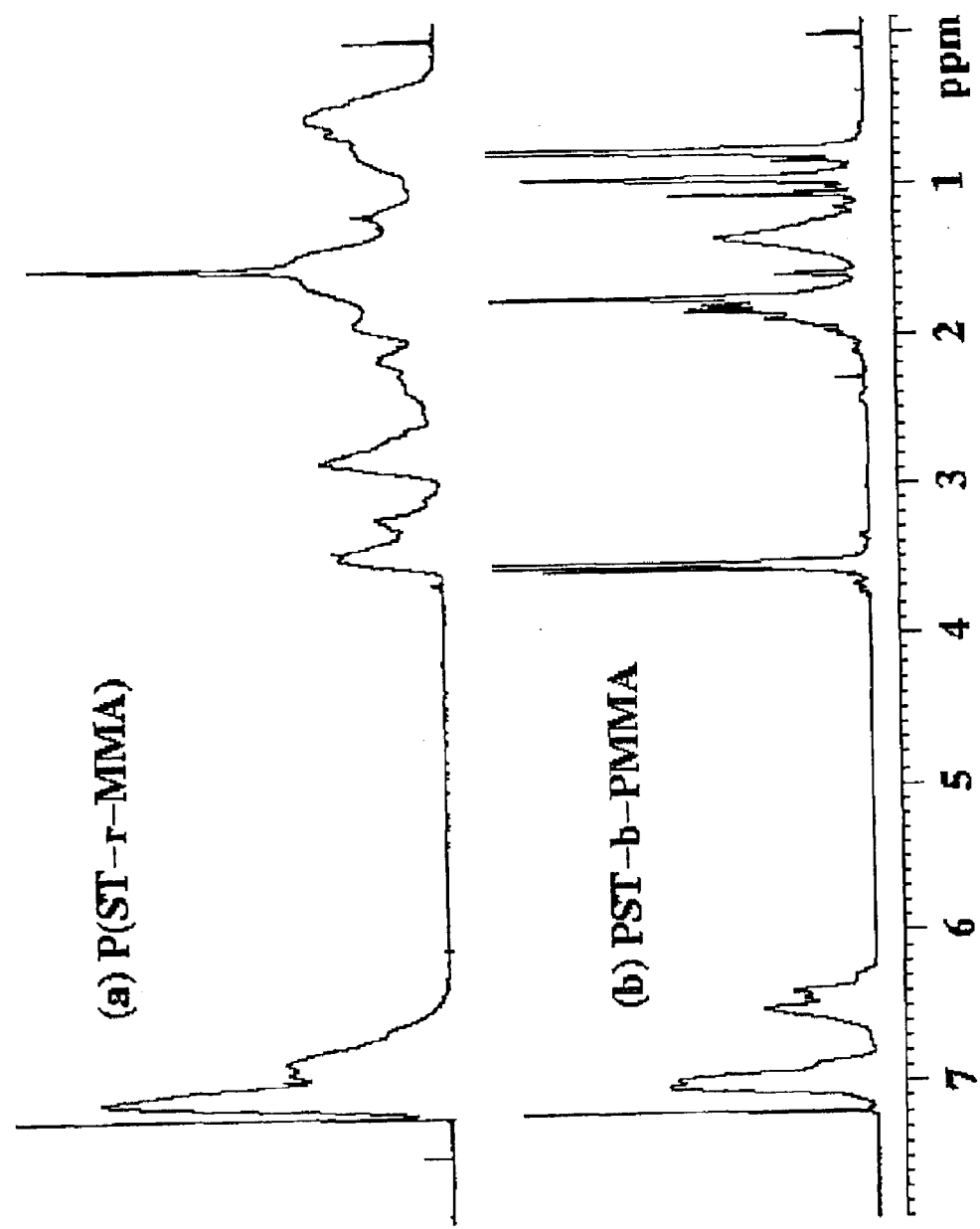
FIG. 3 is graphical representation of inventive polymer nuclear magnetic resonance characteristics.

As shown in FIG. 3, $^1$H-NMR spectra of (a) P(ST-r-MMA) (b) PST-b-PMMA made from BPO in [bmim]PF$_6$ demonstrate that the polymers are not of a random nature since resonances that would reflect a styrene unit next to a methyl methacrylate unit are not detected. Fractional precipitation was used to further verify the formation of the block copolymers, since this method provides evidence for the formation of blocky copolymers. (B. Hazer et al.; S. Nagarajan et al.)

Example 10

Figure 4A:
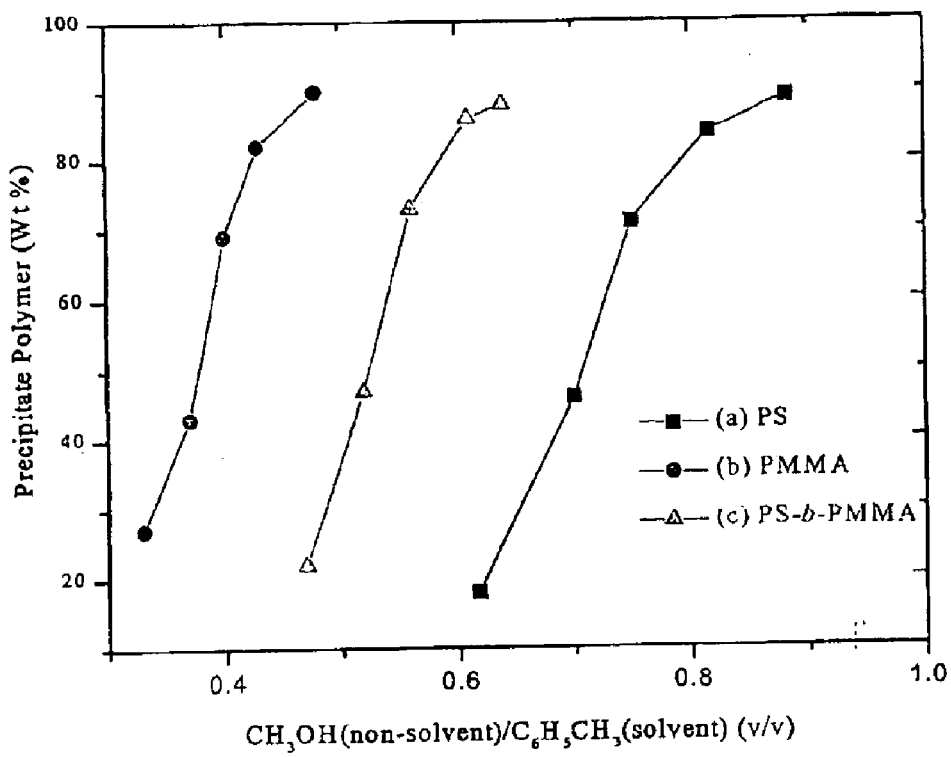
FIG. 4A is graphical representation of inventive polymer fractional precipitation characteristics of (a) P(ST-r-MMA) and (b) PST-b-PMMA.

FIG. 4A shows the fractional precipitation curves of (a) PS; (b) PMMA; (c) PS-b-PMMA (S1M1 in Table 4). Solvent: toluene, non-solvent: methanol. Even though toluene is a good solvent and methanol is a non-solvent for both PS and PMMA, their different solubility parameters result in different precipitation behavior as indicated in the positions of the precipitation curves. It is very important to notice that many factors, such as molecular weight, molecular weight distributions, microstructures, temperature, control the precipitation behavior of a polymer. (F. Francuskiewicz) FIG. 4A shows that the precipitation curve for the extracted polymer is located between those of PS and PMMA, which further demonstrates the successful synthesis of blocky styrene and MMA copolymers. As mentioned early, it also is possible to produce PS-g-PMMA during this process. The final product is PS-b-PMMA, PS-g-PMMA or a mixture thereof. The characterization methods used above do not distinguish between PS-b-P and PS-g-PMMA. A detailed study of these polymers is performed using SEC equipped with multi-angle laser light scattering detectors (SEC-MALLS).

Example 11

Polymerization of MMA or Styrene in RTIL

The two monomers MMA and styrene, in the IL [C$_4$mim][PF$_6$], are polymerized by free-radical polymerization of the two monomers MMA and styrene, in the IL [C$_4$mim][PF$_6$], using the conventional radical initiators, 2,2'-azobis-isobutyronitrile (AIBN) and benzoyl peroxide (BPO). Resulting polymers are purified from the reaction mixture using ethanol/water mixtures and the IL solvents recovered.

Figure 4B:
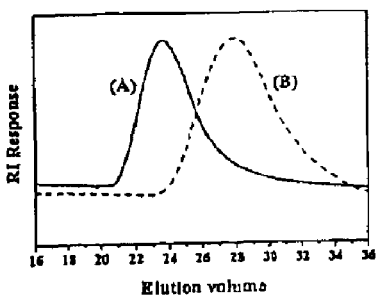
FIG. 4B is graphical representation of inventive polymer size exclusion chromatography characteristics.

In Table 5, below, results from polymerization of MMA and styrene in [C$_4$mim][PF$_6$], initiated by AIBN and BPO respectively, are shown and are compared with data obtained under comparable conditions using benzene as solvent. Both polymers, polymethyl methacrylate (PMMA) and polystyrene (PS), have up to 10× higher molecular masses than when synthesized in benzene, at the same monomer to initiator molar ratio. In both the IL and organic solvents, the polymers exhibit polydispersities typical of homogeneous free radical polymerization products, despite the fact that in the IL case, the polymers formed are insoluble in the reaction medium. Also, polymerizations in the IL are very rapid; complete conversion of monomer to polymer is achieved after about eight hours polymerization time. In contrast, in conventional solvents the polymerization require several times this period to generate complete conversion. FIG. 4B shows SEC traces of PMMA (A) polymerized using AIBN in [C$_4$mim][PF$_6$] at 65° C. for 1 h (B) polymerized using AIBN in benzene at 65° C. for 1 h. The molecular weight of PMMA obtained in [C$_4$mim][PF$_6$] is higher than that obtained in benzene.

The reactions are terminated by quenching the reaction mixtures into methanol, or aqueous ethanol. The IL is miscible with methanol and although regarded as 'hydrophobic', is miscible with aqueous ethanol over a large range.(Swatloski et al.) The polymer products, insoluble in these solvents, are isolated by filtration. RTIL is recovered by evaporation of the filtrates. Alternatively, since the polymer phase separates from the IL a simple gravimetric separation of polymer from the IL is possible. Initial precipitation and isolation of polymer yields materials containing low concentrations of entrained IL, identified by DSC.

Example 12

Instrumentation

Size exclusion chromatography (SEC) is used to measure number-average (M$_n$) and weight-average (M$_w$) molecular weights and polydispersities, M$_w$/M$_n$, of the polymers with respect to PMMA and PS standards (Pressure Chemical Co.). The SEC experiments are carried out at 30° C. in tetrahydrofuran using a Waters 510 pump and Waters 410 differential refractometer detector (flow rate: 1 cm$^3$ min$^{-1}$, columns: Waters 500 Å, 10$^3$ Å, 10$^4$ Å, 10$^5$ Å, 10$^6$ Å pore sizes).

Example 13

Polymerization.

Polymerizations are performed under high vacuum to ensure that the systems were oxygen free. The initiator (BPO or AIBN) and solvent ([C$_4$mim][PF$_6$]) are charged into a round bottom flask with a constriction, and degassed for 2 h. A quantity of monomer is then distilled into the reactor. The flask is removed from the vacuum line by heat-sealing at the constriction and placed in a pre-heated water bath. The polymerization is allowed to continue for 1–8 h and is stopped by precipitation into methanol or ethanol/water mixture. Monomers and initiators are soluble in this IL and polymer begins to phase separate shortly after polymerization begins.

Example 14

TABLE 5

Homopolymerization in [C$_4$mim][PF$_6$], of styrene using benzoyl peroxide (BPO) as initiator and methyl methacrylate (MMA) using 2,2'-azobisisobutyronitrile (AIBN) as initiator. Reactions were performed at 75° C. (BPO) and 65° C. (AIBN).

| Run | Solvent | monomer (cm$^3$) | Initiator (cm$^3$) | (×10$^3$ mmol) | Time (h) | Yield (%) | M$_n$ × 10$^{-5}$ | M$_w$/M$_n$ |
|---|---|---|---|---|---|---|---|---|
| Styrene polymerization using BPO as initiator (75° C.) |||||||||
| 1 | [C$_4$mim][PF$_6$] | 10 | 1 | 4.1 | 8 | 96 | 1.18 | 3.63 |
| 2 |  | 10 | 1 | 20.7 | 8 | 99 | 0.86 | 2.70 |
| 3 |  | 10 | 1 | 41.3 | 8 | 97 | 0.45 | 2.46 |
| 4 |  | 10 | 1 | 20.7 | 1 | 27 | 0.41 | 2.04 |
| 5 | benzene | 10 | 1 | 20.7 | 8 | 9 | 0.091 | 1.98 |
| 6 |  | 10 | 1 | 4.1 | 1 | no polymer formed |  |  |
| MMA polymerization using AIBN as initiator (65° C.) |||||||||
| 7 | [C$_4$mim][PF$_6$] | 10 | 1 | 6.1 | 8 | 100 | 9.91 | 2.05 |
| 8 |  | 10 | 1 | 30.4 | 8 | 98 | 8.40 | 1.91 |
| 9 |  | 10 | 1 | 60.9 | 8 | 99 | 7.57 | 1.72 |
| 10 |  | 10 | 1 | 30.4 | 1 | 33 | 4.04 | 2.02 |
| 11 | benzene | 10 | 1 | 30.4 | 8 | 17 | 1.32 | 1.89 |
| 12 |  | 10 | 1 | 30.4 | 1 | 3 | 0.89 | 1.84 |

Example 15

Instrumentation. SEC is used to measure molecular weights and molecular weight distributions, M$_w$/M$_n$, with respect to polystyrene (PS) standards (Pressure Chemical Co.). The SEC experiments are carried out at 30° C. in THF using a Waters 510 pump and a Waters 410 differential refractometer as detector (flow rate: 1 ml/min, columns: Polymer Standards Service; one 100 Å pore size and one mixed bed "linear" column (10$^4$ to 10$^6$ MW) in series).

$^1$H-NMR spectra of the polymers are obtained on a Bruker ARX-400 spectrometer at room temperature. Sample concentrations are about 10~25% (w/v) in CDCl$_3$. Trace CHCl$_3$ in CDCl$_3$ (7.26 ppm) or TMS (0 ppm) is used as an internal reference. DSC (Mettler-Toledo model: DSC 30) is used to determine the glass transition temperatures (Tg) at a heating rate of 10° C./min. Fractional precipitations are done using toluene as solvent and methanol as non-solvent, according to the literature. (Hazer and Baysal)

This patent application claims priority of provisional patent application Ser. No. 60/280,201 filed Mar. 30, 2001 which is hereby incorporated by reference in its entirety. This application also claims priority of provisional patent application Ser. No. 60/279,993 filed Mar. 30, 2001 which is hereby incorporated by reference in its entirety.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

References

S. A. Arnautov, *Synth. Metals* 1997, 84, 295.

C. H. Bamford in *Encyclopedia of Polymer Science & Engineering*, John Wiley & Sons, New York, 1985, Vol. 13, pp. 708–867.

P. Bonhote, A. P. Dias, M. Armand, N. Papageorgiou, K. Kalyanasundaram, and M. Gratzel, "Hydrophobic, Highly Conductive Ambient Temperature Molten Salts", Inorg. Chem., 35, 1168 (1996).

J. Brandrup and E. H. Immergut, *Polymer Handbook*, New York: John Wiley and Sons (1989), p. II-94).

C. Bunyakan, and D. Hunkeler, "Precipitation Polymerization of Acrylic Acid in Toluene. I: Synthesis, Characterization, and Kinetics", Polymer, 40, 6213 (1999).

D. A. Canelas and J. M. DeSimone, "Dispersion Polymerization of Styrene in Carbon Dioxide Stabilized with Poly(styrene-b-dimethylsiloxane)", Macromolecules, 30, 5673 (1997).

D. A. Canelas and J. M. DeSimone, "Polymerization in Liquid and Supercritical Carbon Dioxide", Adv. Polym. Sci., 133, 103 (1997).

D. A. Canelas, D. E. Betts, and J. M. DeSimone, "Dispersion Polymerization of Styrene in Supercritical Carbon Dioxide: Importance of Effective Surfactants", Macromolecules, 29, 2818 (1996).

D. A. Canelas, D. E. Betts, J. M. DeSimone, M. Z. Yates and K. P. Johnston, "Poly(vinyl acetate) and Poly(vinyl acetate-co-ethylene) Latexes via Dispersion Polymerization in Carbon Dioxide", Macromolecules, 31, 6794 (1998).

R. T. Carlin and J. S. Wilkes, J. Mol. Catalysis, 63, 125 (1990).

R. T. Carlin. R. A. Osteryoung, J. S. Wilkes and J. Rovang, "Studies of Ti(IV) Chloride in a Strongly Lewis Acidic Molten Salt: Electrochemistry and Titanium NMR and Electronic Spectroscopy", Inorg. Chem., 29, 3003 (1990).

R. T. Carlin, R. A. Osteryoung, *J. Electrochem. Soc.* 1994, 141, 1709.

R. T. Carlin, R. A. Osteryoung, *J. Mol. Cat.* 1990, 63, 125.

R. T. Carlin, J. S. Wilkes in *Chemistry of Nonaqueous Solutions* (Eds.: Mamantov, G.; Popov, A. I.), VCH, Weinheim, 1994, pp 227–276.

A. J. Carmichael, D. M. Haddleton, S. A. F. Bon, K. R. Seddon, *J. Chem. Soc., Chem. Commun.* 2000, 1237.

Y. Chauvin, L. Mussmann, H. Olivier, "A Novel Class of Versatile Solvents for Phase Catalysis-Hydrogenation, Isomerization, and Hydroformylation of Alkenes Catalyzed by Rhodium Complexes in Liquid 1,3-Dialkylimidazolium Salts", Angew. Chem. Int. Edn. Eng., 34, 2698 (1996).

Y. Chauvin, H. Oliver-Bourbigou, *CHEMTECH* 1995, 25, 26.

A. I. Cooper, W. P. Hems, and A. B. Holmes, "Synthesis of Highly Cross-Linked Polymers in Supercritical Carbon Dioxide by Heterogeneous Polymerization", Macromolecules, 32, 2156 (1999).

J. M. DeSimone, E. E. Maury, Y. Z. Meuceloglu, J. B. McClain, T. R. Romack, and J. R. Combs, "Dispersion Polymerization in Supercritical Carbon Dioxide", Science, 265, 356 (1994).

F. Francuskiewicz. *Polymer Fractionation* Springer Lab Manual, Berlin, 1994.

M. Freemantle, "Designer Solvents: Ionic Liquids may Boost Clean Technology Development," Chem. Eng. News (Mar. 30, 1998) 32–37.

M. K. Georges, R. P. N. Veregin, P. M. Kazmaier, and G. S. Hamer, "Taming the Free-Radical Polymerization Process", Trends Polym. Sci., 2, 66 (1994).

M. K. Georges, R. P. N. Veregin, P. M. Kazmaier, G. S. Hamer, and M. Saban, "Narrow Polydispersity Polystyrene by a Free-Radical Polymerization Process—Rate Enhancement", Macromolecules, 27, 7228 (1994).

L. M. Goldenberg and R. A. Osteryoung, "Benzene Polymerization in 1-ethyl-3-methylimidazolium chloni-$AlCl_3$ Ionic Liquid", Synth. Metals, 64, 63 (1994).

C. M. Gordon, *Appl. Catal. A,* 2002, 222, 101.

M. Guerrero; G. Beinert, J. E. Herz, *J. Appl. Polym. Sci., Appl. Polym. Symposia,* (SLAP'90 October 1990), 1990, pp 43–58).

C. J. Hawker, "Living Free Radical Polymerization: A Unique Technique for the Preparation of Controlled Macromolecular Architectures", Acc. Chem. Res., 30, 373 (1997).

B. Hazer; B. M. Baysal, *Polymer,* 1986, 27, 961.

J. D. Holbrey and K. R. Seddon, "Ionic Liquids", Green Chemistry, in press (1999).

J. D. Holbrey, K. R. Seddon, *Clean Products and Processes* 1999, 1, 223.

Y.-L. Hsiao and J. M. DeSimone, J. Polym. Sci., Part A: Polym. Chem., 35, 2009 (1997).

Y.-L. Hsiao, E. E. Maury, J. M. DeSimone, S. M. Mawson, and K. P. Johnston, "Dispersion Polymerization of Methyl Methacrylate Stabilized with Poly(1,1-dihydroperfluorooctyl acrylate) in Supercritical Carbon Dioxide", Macromolecules, 28, 8159 (1995).

J. G. Huddleston, A. E. Visser, W. M. Reichert, H. D. Willauer, G. A. Broker and R. D. Rogers, *Green Chem.,* 2001, 3, 156.

R. L. Hussey, *Pure Appl. Chem.* 1988, 60, 1763.

C. Kafetzopoulos; A. Valavanidis, I. Yioti, and N. Hadjichristidis, "Synthesis of Block Terpolymers of N-MethylMethcrylamide with Styrene and Isoprene by Living Radical Polymerization", Polym. Int., 47, 226 (1998).

J. L. Kendall, D. A. Canelas, J. L. Young, and J. M. DeSimone, "Polymerization in Supercritical Carbon Dioxide", Chem. Rev., 99, 543 (1999).

V. M. Kobryanskii; S. A. Arnautov *J. Chem. Soc., Chem. Commun.* 1992, 727.

C. Lepilleur and E. J. Beckman, "Dispersion Polymerization of Methyl Methacrylate in Supercritical $CO_2$", Macromolecules, 30, 745 (1997).

P. E. J. Louis; R. G. Gilbert, D. H. Napper, P. Teyssie, R. Fayt, *Macromolecules* 1991, 24, 5746.

A. Matsumoto; K. Yokoi, S. Aoki, *Polym. J.* 1998, 30, 361.

A. B. McEwen, H. L. Ngo, K. LeCompte, and J. L. Goldman, "Electrochemical Properties of Imidazolium Salt Electrolytes for Electrochemical Capacitor Calculations", J. Electrochem. Soc., 146, 1687 (1999).

S. Nagarajan; K. S. V. Srinivasan, *J. Polym. Sci., Part A: Polym. Chem.* 1995, 33, 2925.

H. Narita; H. Kinoshita, T. Araki, *J. Polym. Sci., Part A: Polym. Chem.* 1992, 30, 333.

A. Noda and M. Watanabe, *Electrochim. Acta,* 2000, 45, 1265.

M. L. O'Neill, M. Z. Yates, K. P. Johnston, C. D. Smith, and S. P. Wilkinson, "Dispersion Polymerization in Supercritical $CO_2$ with a Siloxane-Based Macromonomer: 1. The Particle Growth Regime", Macromolecules, 31, 2838 (1998).

M. L. O'Neill, M. Z. Yates, K. P. Johnston, C. D. Smith and S. P. Wilkinson, "Dispersion Polymerization in Supercritical $CO_2$ with Siloxane-Based Macromonomer: 2. The particle Formation Regime", Macromolecules, 31, 2848 (1998).

G. Odian, *Principles of Polymerization,* New York: John Wiley and Sons (1991), pp. 241–255.

T. E. Patten, and K. Matyjaszewski, "Copper (I)—Catalyzed Atom Transfer Radical Polymerization", Acc. Chem. Tes., 32, 895 (1999).

*Polymer Handbook,* 4th Ed. Brandrup, J.; Immergut, E. H. & Grulke, E. A. Eds. John Wiley & Sons Inc. New York, N.Y., 1999).

T. Sato, J. Miyanoto and T. Otsu, "Long-Lived Polymer Radicals. VI. Polymerization of N-Methylmethacrylamide with formation of Living Propagating Radicals", J. Polym. Sci., Polym. Chem. Ed., 22, 3921 (1984).

M. Sawamoto, and M. Kamignito, "Transition Metal Catalyzed Living Radical Polymerization", Chemtech, 30 (June 1999).

R. A. Scott, and N. A. Peppas, "Kinetic Study of Acrylic Acid Solution Polymerization," AIChE Journal, 43, 135 (1997).

R. B. Seymour, P. D. Kincaid, D. Owen, R. *Adv. Chem. Ser.* 1973, 179, 230).

R. B. Seymour; G. A. Stahl, *J. Polym. Sci. Chem., Polym. Chem. Ed.* 1976, 14, 2545.

K. A. Shaffer and J. M. DeSimone, Trends Polym. Sci., 3, 146 (1995).

K. A. Shaffer, T. A. Jones, D. A. Canelas, J. M. DeSimone, and S. P. Wilkinson, "Dispersion Polymerizations in Carbon Dioxide Using Siloxane-Based Stabilizers", Macromolecules, 29, 2704 (1996).

R. Sheldon, *Chem. Commun.,* 2001, 2399

J. S. Shih, T. E. Smith and R. B. Login, U.S. Pat. No. 5,015,708 (1991).

J. S. Shih, U.S. Pat. No. 5,191,043 (1993).

H. Shiho and J. M. DeSimone, "Dispersion Polymerization of Acrylonitrile in Super-Critical Carbon Dioxide", Macromolecules, 33, 1565 (2000).

H. Shiho and J. M. DeSimone, J. Polym. Sci., Part A: Polym. Chem., 37, 2429 (1999).

G. A. Stahl, R. B. Seymour, *Polym. Sci. Technol.* 1977, 10, 217).

R. P. Swatloski, A. E. Visser, W. M. Reichert, G. A. Broker, L. M. Farina, J. D. Holbrey and R. D. Rogers, *Chem. Commun.*, 2001, 2070

R. P. Swatloski, A. E. Visser, W. M. Reichert, G. A. Broker, L. M. Farina, J. D. Holbrey and R. D. Rogers, *Green Chem.*, 2002, published on the web, 11th Dec. 2001.

D. C. Trivedi, *J. Chem. Soc., Chem. Commun.* 1989, 544.

A. E. Visser, R. P. Swatloski and R. D. Rogers, *Green Chem.*, 2000, 2, 1

A. E. Visser, R. P. Swatloski, W. M. Reichert, R. D. Rogers, R. Mayton, S. Sheff, A. Wierzbicki and J. H. Davis Jr., *Chem. Commun.*, 2001, 1, 135.

J. S. Wang, K. Matyjaszewski, *J. Am. Chem. Soc.* 1995, 117, 5614.

P. Wasserscheid, W. Keim, W. *Angew. Chem. Int. Ed.* 2000, 39, 3772.

T. Welton, "Room-Temperature Ionic Liquids: Solvents for Synthesis and Catalysis", Chem. Rev., 99, 2071 (1999).

T-M Yong, W. P. Hems, K. L. M. van Nunen, A. B. Holmes, J. H. G. Steinke, P. L. Taylor, J. A. Segal and D. A. Friffen, "Synthesis of Fluorinated Block Copolymers and their Applications as Novel Polymerization Surfactants in Supercritical Carbon Dioxide", Chem. Commun., 1811 (1997).

What is claimed is:

1. A process for chemical synthesis comprising the steps of:
    combining a monomer, a free radical initiator and an ionic liquid to obtain a mixture;
    bringing the mixture to a temperature; and
    incubating the mixture at the temperature for a period of time sufficient for a polymerization reaction to occur.

2. The process of claim 1 wherein the ionic liquid comprises an organic cation.

3. The process of claim 1 wherein the ionic liquid has a melting point between −100° C. and 200° C.

4. The process of claim 1 further comprising the step of isolating a polymer from the mixture.

5. The process of claim 4 wherein the polymer is less soluble in the ionic liquid than the monomer.

6. The process of claim 1 further comprising the step of recovering the ionic liquid.

7. The process of claim 1 further comprising the step of removing oxygen from the mixture.

8. The process of claim 1 further comprising the step of terminating a polymerization reaction in the mixture.

9. A process for chemical synthesis comprising the steps of:
    combining a monomer and an ionic liquid to obtain a mixture;
    removing oxygen from the mixture; and
    incubating the mixture at a temperature for a period of time sufficient for a polymerization reaction to occur.

10. The process of claim 9 wherein the ionic liquid comprises an organic cation.

11. The process of claim 9 wherein the ionic liquid has a melting point between −100° C. and 200° C.

12. The process of claim 9 further comprising the step of isolating a polymer from the mixture.

13. The process of claim 12 wherein the polymer is less soluble in the ionic liquid than the monomer.

14. The process of claim 9 further comprising the step of recovering the ionic liquid.

15. The process of claim 9 further comprising the step of mixing an initiator with the mixture wherein the initiator is a free radical initiator.

16. The process of claim 9 further comprising the step of terminating a polymerization reaction in the mixture.

17. The process of claim 9 wherein the temperature ranges from 15° C. to 250° C.

18. The process of claim 9 wherein the temperature ranges from 25° C. to 200° C.

19. The process of claim 9 wherein the temperature ranges from 50° C. to 200° C.

20. A process of chemical synthesis comprising the steps of:
    combining a first monomer, an initiator and an ionic liquid to obtain a mixture;
    bringing the mixture to a first temperature;
    incubating the mixture at the first temperature for a period of time sufficient for a first polymerization reaction to occur;
    removing an unreacted monomer from the mixture;
    adding a second monomer to the mixture;
    bringing the mixture to a second temperature; and
    incubating the mixture for a period of time sufficient for a second polymerization reaction to occur.

21. The process of claim 20 wherein the ionic liquid comprises an organic cation.

22. The process of claim 20 wherein the ionic liquid has a melting point between −100° C. and 200° C.

23. The process of claim 20 further comprising the step of isolating a polymer from the mixture.

24. The process of claim 23 wherein the polymer is less soluble in the ionic liquid than the first monomer.

25. The process of claim 20 further comprising the step of recovering the ionic liquid.

26. The process of claim 20 wherein the initiator is a free radical initiator.

27. The process of claim 20 further comprising the step of removing oxygen from the mixture.

28. The process of claim 20 further comprising the step of terminating a polymerization reaction in the mixture.

29. A polymerization mixture comprising:
    a polymer, a free radical initiator, and an ionic liquid consisting of an anion and an organic cation selected from the group consisting of N-alkylpyridiniums, alkylammoniums, alkylphosphoniums and N,N'dialkylimidazoliums.

30. The mixture of claim 29 wherein the ionic liquid has a melting point between −100° C. and 200° C.

* * * * *

UNITED STATES PATENT AND TRADEMARK OFFICE
CERTIFICATE OF CORRECTION

PATENT NO. : 6,924,341 B2
APPLICATION NO. : 10/473455
DATED : August 2, 2005
INVENTOR(S) : Jimmy W. Mays et al.

It is certified that error appears in the above-identified patent and that said Letters Patent is hereby corrected as shown below:

On the title page item (73),

**Assignee, replace "The UAB Research Foundation" with
-- The UAB Research Foundation, and The University of Alabama --**

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 6,924,341 B2  Page 1 of 1
APPLICATION NO. : 10/473455
DATED : August 2, 2005
INVENTOR(S) : Jimmy W. Mays et al.

It is certified that error appears in the above-identified patent and that said Letters Patent is hereby corrected as shown below:

On the title page item (73), Assignee, replace "The UAB Research Foundation" with -- The UAB Research Foundation, and The University of Alabama --

Signed and Sealed this

Twenty-seventh Day of May, 2008

JON W. DUDAS
*Director of the United States Patent and Trademark Office*